(12) United States Patent
Ho et al.

(10) Patent No.: US 10,951,778 B1
(45) Date of Patent: Mar. 16, 2021

(54) NESTED EMAIL ADDRESSING FOR DOCUMENT PROCESSING AND DELIVERY

(71) Applicant: Biscom, Inc., Westford, MA (US)

(72) Inventors: Shu-Kuang Ho, Carlisle, MA (US);
William J. Ho, Carlisle, MA (US);
Carlos Mainemer, Nashua, NH (US);
Zhonghui Xiao, Westford, MA (US);
A. Christian MacKenzie, Weston, MA (US); Gilbert William Agudelo, Arlington, MA (US)

(73) Assignee: Biscom, Inc., Westford, MA (US)

( * ) Notice: Subject to any disclaimer, the term of this patent is extended or adjusted under 35 U.S.C. 154(b) by 0 days.

(21) Appl. No.: 16/697,803

(22) Filed: Nov. 27, 2019

Related U.S. Application Data

(63) Continuation-in-part of application No. 16/136,772, filed on Sep. 20, 2018, now abandoned.

(60) Provisional application No. 62/560,903, filed on Sep. 20, 2017.

(51) Int. Cl.
*H04N 1/00* (2006.01)
*H04L 12/58* (2006.01)

(52) U.S. Cl.
CPC ....... *H04N 1/00212* (2013.01); *H04L 51/066* (2013.01); *H04L 51/08* (2013.01); *H04L 51/28* (2013.01); *H04N 1/00244* (2013.01)

(58) Field of Classification Search
CPC .. H04N 1/00212; H04N 1/64; H04N 1/32708; H04N 2201/3221; H04N 2201/3215; H04N 2201/3271
USPC ........................................................ 358/1.15
See application file for complete search history.

(56) References Cited

U.S. PATENT DOCUMENTS

2016/0285809 A1 * 9/2016 Addante ................. H04L 51/14

* cited by examiner

*Primary Examiner* — Saeid Ebrahimi Dehkordy
(74) *Attorney, Agent, or Firm* — Clocktower Law; Erik J. Heels; Michael A. Bartley

(57) ABSTRACT

Nested email delivery substitutes a control token into an recipient email address, and uses the result as the username in email to a domain of a secure processing server. At the secure processing server, the recipient email address is extracted, control token identified, and any attachments processed and delivered based on the control token. The secure processing server may be an internet-based secure fax server and attachments processed as native documents for high-resolution, color faxing. Delivery may also be via certified email, or native documents may be processed into workspace storage or through other configured processing. Multiple tokens may be combined to trigger multiple actions.

9 Claims, 10 Drawing Sheets

NESTED EMAIL ADDRESSING FOR DOCUMENT PROCESSING AND DELIVERY

CROSS-REFERENCE TO RELATED APPLICATIONS

This utility patent application is a continuation-in-part of and claims priority from U.S. patent application Ser. No. 16/136,772, filed Sep. 20, 2018, titled "High Resolution, Color Fax System", naming inventors Shu-Kuang Ho, Carlos Mainemer, Zhonghui Xiao, A. Christian MacKenzie, Michael J. Gayowski, and Gilbert William Agudelo, which claims priority from U.S. provisional patent application Ser. No. 62/560,903, filed Sep. 20, 2017, titled "High Resolution, Color Fax System" and naming inventors Shu-Kuang Ho, Carlos Mainemer, Zhonghui Xiao, A. Christian MacKenzie, Michael J. Gayowski, and Gilbert William Agudelo.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright 2019 Biscom.

BACKGROUND

Field of Technology

This relates to document processing and delivery, and more particularly to processing and delivery through nested email addressing with control tokens.

Background

Standard email involves delivery of messages to one or more recipients identified by email address. Documents can be delivered via email as attachments. Other file delivery methods include faxing and file transfer protocols.

Faxing originated as telephonic transmission of documents as images. As technology has improved, faxing has improved from purely fax machine to fax machine, to include fax over IP, email-to-fax, and fax servers. Advantages of faxing, over other forms of document delivery, include security, immutability of image format, and reliability through confirmation of delivery. T.30 specifies the protocol for fax over phone lines (PSTN), with T.38 specifying a protocol for fax over IP that can support T.30 from both sender and receiver and relay over a packet network. However many issues with fax, grounded in the telephonic roots, remain. Fax protocols use a G3 encoded fax image format, which is low resolution (up to 600 dpi) in TIFF multi-page format. Faxing remains largely black-and-white, low resolution, non-instantaneous, and requires extensive error correction due to poor connections or lost data packets.

DESCRIPTION OF PRIOR ART

International Patent Publication WO 98/58335 (published Dec. 23, 1998, naming inventor Matsumoto, and titled "STORING ELECTRONICALLY TRANSMITTED FACSIMILES ON A WEB SITE") discloses, in the Abstract, "The invention features a method and apparatus for using a facsimile (fax) machine which is compatible with the World Wide Web (WWW) to store faxes on a web site, from which the faxes can later be viewed and retrieved by users. The web site on which the web-compatible fax machine stores faxes is uniquely associated with the fax machine. The web-compatible fax machine converts faxes into an appropriate format before storing them on the web site. Optionally, the web site may be password-protected to prevent unauthorized users from accessing stored faxes." This solution associates specific websites with specific fax machines, and allows uploading received faxes from a fax machine to the specific website for online, remote access.

United States Patent Application Publication 2014/0177001 (published Jun. 26, 2014, naming inventor Meyers et al., and titled "INTERNET FAX MESSAGE SEARCHING AND FAX CONTENT DELIVERY USING KEYWORD DETECTION") discloses, in the Abstract, "A system for providing an internet fax service has an engine to process a raw fax document, received for a user of the internet fax service, using digital character recognition to produce recognized text or an associated formatted text document. A conversion engine may convert the raw fax to native file format being one of a) word processor format, b) spreadsheet format, c) slide presentation format, or d) another format that can be read on a user interface. An internet server is to make the native file format document available to the user over an internet. A fax content processing unit is to perform keyword scanning of the recognized text, and then allows the user to search for stored faxes by keyword." This system performs optical character recognition (OCR) on traditional fax image documents to create searchable documents, and makes those accessible through a web server.

United States Patent Application Publication 2014/0268219 (published Sep. 18, 2014, naming inventor Ho et al., and titled "TRANSMISSION OF FACSIMILES VIA INTERNET PROTOCOL OVER PUBLIC NETWORKS") discloses, in the Abstract, "A computer system maps unique addresses to the conventional fax numbers of conventional fax devices (such as conventional fax machines and computing devices having conventional fax capabilities). A transmitting user who is connected to the Internet may send an IP fax to a receiving user who is also connected to the Internet by addressing the receiving user using the receiving user's unique address, even if the sending user and receiving user are not within the same local network. A server outside of the receiving user's local network mediates the transmission of the IP fax from the transmitting user to the receiving user. The server may select a preferred transmission method of the recipient (e.g., conventional fax, IP fax, email, or secure document delivery) and transmit the fax to the receiving user using that preferred transmission method. Transmitted faxes may be in color and/or contain high-definition content." This system creates a mapping between telephonic fax numbers and IP fax numbers, and enables communication and delivery of faxes and other electronic packages based on the IP fax number.

None of the above provides a solution which non-disruptively merges traditional fax deployment with secure high-resolution, color, faxing including (1) secure upload of documents for faxing, (2) conversion into a high resolution color fax image, (3) secure storage and notification to recipient of the created fax image, (4) secure access to view, retrieve, or print a received fax, (5) automatic printing capability, nor merges such fax capabilities with document processing through nested email delivery. What is needed, therefore, is a system that overcomes the above-mentioned limitations and that includes the features enumerated above.

BRIEF SUMMARY

An improved fax solution is a secure file transfer system for high-resolution color faxing. An internet-based secure fax server allows upload (auto-post) of native documents for faxing. At the server, the native documents are translated into an image format and combined to create a fax document, with a timestamp marked on each page. A cover page may be included as a first page in the multi-page fax image. The recipient may be notified (such as via email) of the new fax, which may be retrieved (auto-fetch), viewed, or directly printed (auto-print) from the secure fax server. A delivery device may be configured to automatically receive and print faxes sent to the recipient, and also connect to phone lines to preserve existing fax implementations. Access to the secure fax server may be direct (through web browser access) or application based via an application programming interface (API), with secure access established for each user account and file transfer. Recipients may be identified by email or traditional fax number. The fax documents on the secure fax server may be high-resolution, color images.

Nested email addressing allows email deliveries to the secure fax server such that all emails to a specific domain are parsed to identify if a different domain email is included in the username of email addressed to the specific domain. The different domain email is identified by one or more control tokens replacing the at ('@') sign within the different domain email. The control tokens identify processing and delivery options performed by the secure fax server, extending functionality to include certified email and workspace storage in additional to digital faxing. This nested email delivery creates an email-to-cloud service for anyone to send or receive securely through the secure fax server.

Nested email addressing may extend beyond fax delivery, allowing the control token to specify any document processing and specific delivery options.

Features and Advantages

The secure fax system provides true on-demand, anywhere access to high-resolution, color, and secure fax documents.

Users are able to send and receive faxes from any network connected computer device, without requiring accessibility to fax-specific hardware.

Native documents are securely uploaded, converted into fax images, and stored securely for recipient access.

Confirmation notifications enable tracking receipt and viewing of sent faxes, with error notifications alerting senders to any unsuccessful fax operations.

Automatic printing enables replacing existing fax machines with high-resolution, color fax printing using the same fax number previously used for traditional faxes.

Migration is enabled from existing analog fax implementations to high-resolution, color fax without interruption of fax services or requiring new fax number.

BRIEF DESCRIPTION OF THE DRAWINGS

In the drawings, closely related figures and items have the same number but different alphabetic suffixes. Processes, states, statuses, and databases are named for their respective functions.

DETAILED DESCRIPTION, INCLUDING THE PREFERRED EMBODIMENT

In the following detailed description, reference is made to the accompanying drawings which form a part hereof, and in which are shown, by way of illustration, specific embodiments which may be practiced. It is to be understood that other embodiments may be used, and structural changes may be made without departing from the scope of the present disclosure.

Terminology

The terminology and definitions of the prior art are not necessarily consistent with the terminology and definitions of the current disclosure. Where there is a conflict, the following definitions apply.

A client device is any network connected computing device capable of displaying a graphical user interface. Each client device has a computer processor capable of operating a web browser or other software application, a display, and input controls for users to interact with the display. Client devices include, but are not limited to, desktop computer, laptop computers, tablet computers, smart phones, smart watches, and smart glasses.

A network connected device includes connection to a local or wide area network. Two devices are network connected when connected to the same network. Hardware to connect to networks may include, but is not limited to, wi-fi, ethernet, and 4G hardware devices.

A native document is an electronic file that includes editable text, for example, but not limited to, a document in pdf or doc format.

A fax document is an image format file where any text displayed within the image is not editable through a text editing program. Most commonly, but not exclusively, fax documents are in a multi-page TIFF format or image PDF. Fax documents are delivered, from sender to recipient, through a point-to-point secure communication session.

Operation

Overview

Figure 1:
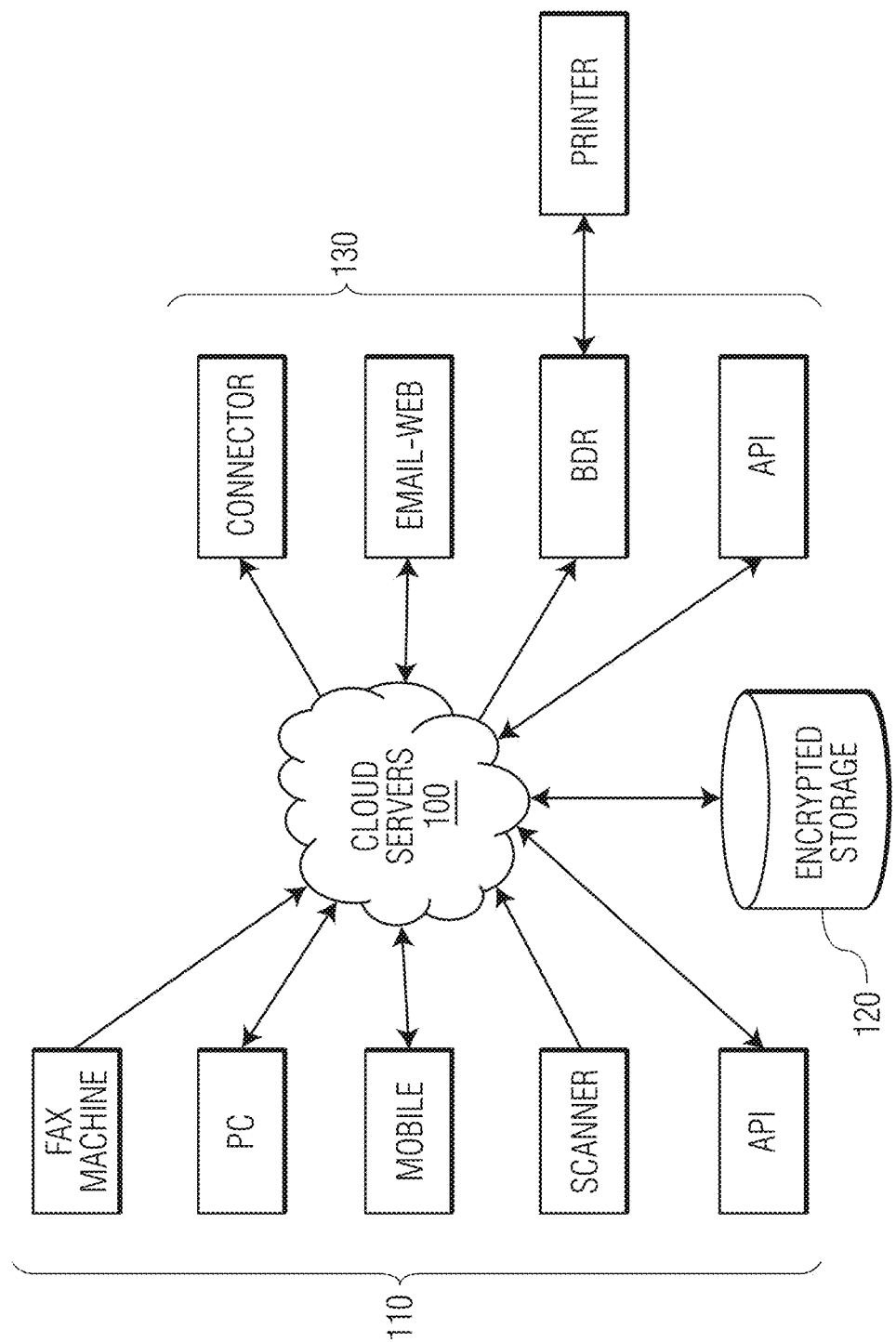
FIG. 1 is a block diagram of the secure file transfer fax system solution sending and receiving components.

Referring to FIG. 1, a solution involves one or more secure fax servers implemented within a cloud computing platform 100 communicating faxes from senders to recipients. Faxes can originate from software applications running on computers 110, including desktop and mobile, scanners, or traditional fax machines. The software applications can be dedicated faxing programs, integrated into other programs via an application programming interface (API), a browser-based web interface, or email client with the document sent as an attachment. The fax may originate as one or more native documents which are translated into a fax document by the cloud server, and stored in encrypted storage 120 by the cloud server. The fax document may then be delivered to the recipient, again through dedicated software applications running on computers 130, including desktop or mobile, other software integrating an API to receive faxes, through a browser-based web interface, through a web connector, through an email-linked login, or automatically delivered and printed to a Biscom Document Router (BDR).

BDR

Figure 2:
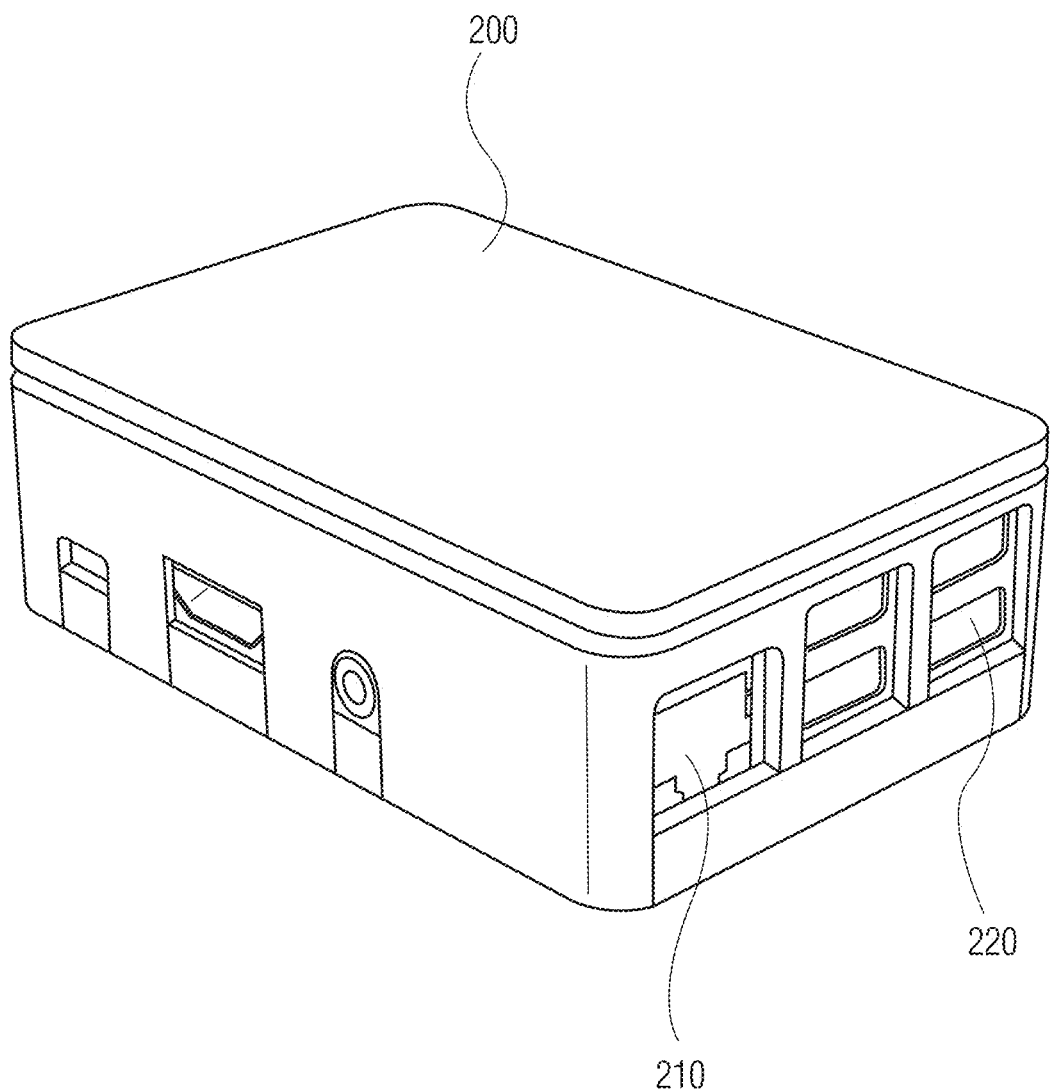
FIG. 2 is a drawing of a Biscom Document Router (BDR).

Referring also to FIG. 2, the BDR 200 is a hardware device allowing direct printing of high-resolution, color faxes, along with seamless integration into existing fax machine setups. The BDR includes an ethernet port 210 or equivalent for connecting to an IP network, and a telephone port with fax cable modem, either built into the BDR or attached via a connected USB dongle connected to a USB port 220, to connect to a telephone line. The BDR may further include one or more USB ports 220 for connecting to a printer. Internal software operating on the BDR may be configured through a browser-driven interface served by a web portal operated by software running on the BDR. Configuration options on the BDR include configuring account access (account identifier and password) for accessing the secure fax server within the cloud services platform. Optional settings may allow configuring a specific server to connect to, which may be used by companies operating their own secure fax server instead of utilizing the default cloud solution. Additional options may configure any printer-specific settings, including connection to a network-based printer or directly attached USB printer. Once configured and powered on, the BDR communicates with the secure fax server within the cloud services platform to receive high-resolution color faxes. Communication involves receiving notification from the secure fax server of a new fax, establishing a secure communication channel with the secure fax server, retrieving the fax document and printing on a configured printer. Retrieval and print results (job completion or any printer error) are communicated to the secure fax server for fax status tracking. The BDR may periodically poll the secure fax server (using configured account information) for new faxes, or register the account information with the secure fax server to receive notification when a new fax arrives. Lights built into the BDR may indicate status, such as fax retrieval in process, printing in process, or any error statuses such as connection errors to the secure fax server. The BDR thus enables receiving and directly printing high-resolution, color faxes.

The fax modem, built into or connected via dongle to the BDR, allows receipt of traditional T.30 faxes over a connected phone line, with received faxes printed on a configured printer. This provides a seamless option to upgrade an existing fax machine without requiring a new fax number. The BDR may be installed in place of an existing fax machine, with existing phone line connected to the BDR. The phone line may then be ported to the secure fax server under a same account as configured for the BDR. Phone line porting traditionally takes multiple days or weeks to resolve. Before porting is complete, faxes to the fax number reach the BDR over the phone line connection. Once ported, all faxes to the fax number are processed by the secure fax server, which then processes them as faxes to deliver to the BDR. All incoming T.30 faxes are delivered in that same quality and resolution, while incoming high-resolution and/or color faxes are delivered without quality or color loss to the BDR. Thus, the BDR enables upgrading existing fax implementations to high-resolution, color fax without interruption of fax service or requiring a new and separate fax number.

Figure 3:
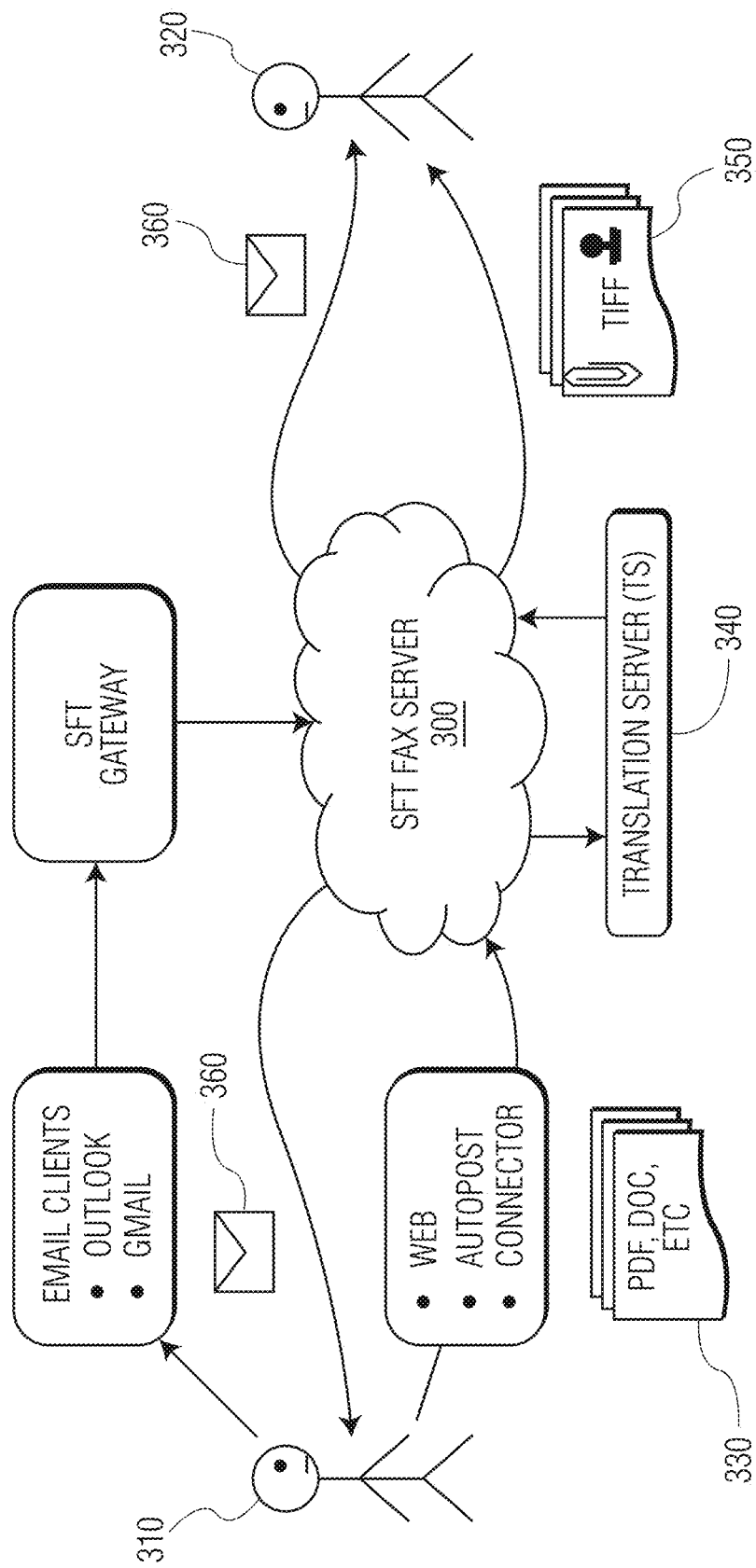
FIG. 3 is an overview of the secure file transfer fax system solution operation.

Also referring to FIG. 3, a secure file transfer fax solution involves secure fax server 300, users 310 and 320 with client devices to send, receive or otherwise access the secure fax server, and network connections between the client devices and secure fax server. With use of a BDR, after configuration of a BDR by user 320, the BDR may automatically handle receipt and printing of faxes. The secure fax server may be implemented as software running on a dedicated computer hardware system, or preferably as software operated on dedicated or dynamically allocated virtual machines within a cloud-computing platform solution, for example Amazon's cloud solutions (including Amazon EC2, AWS, and S3) or Google Cloud Platform.

Originator

Figure 4A:
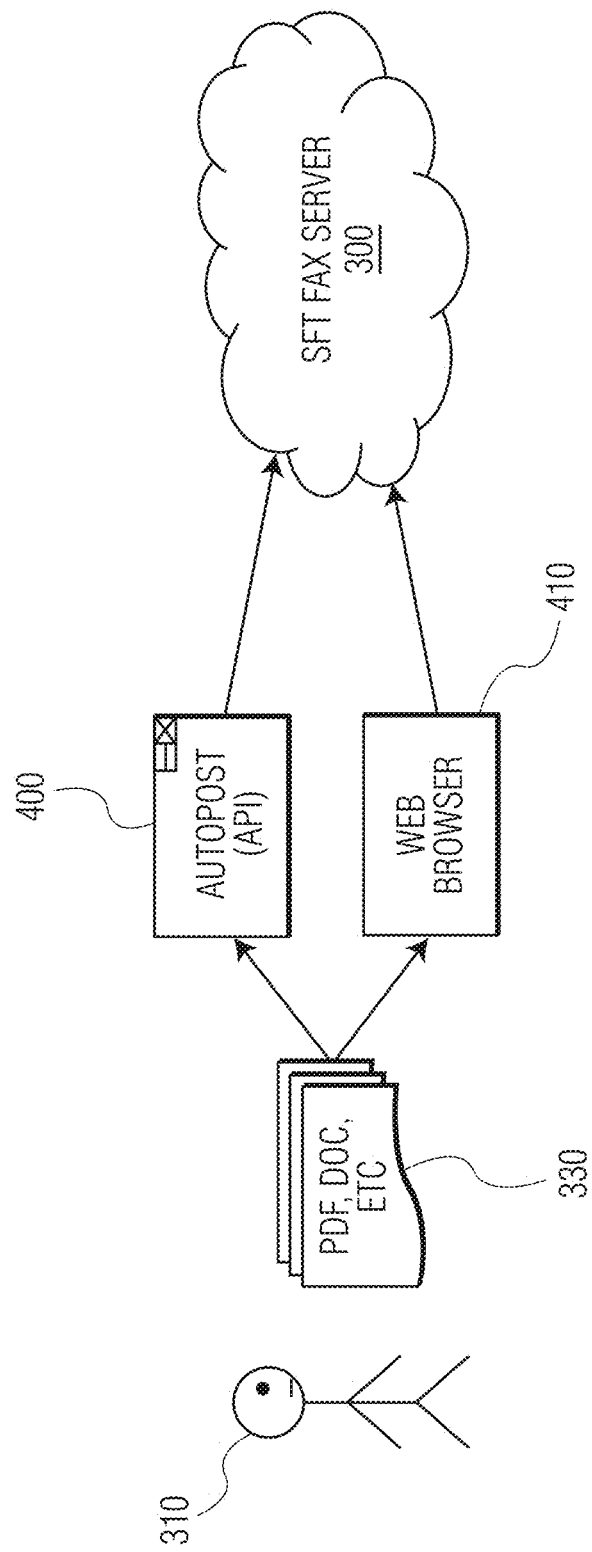
FIG. 4*a* illustrates the origination process for sending a fax through the secure file transfer fax system.

Referring also to FIG. 4a, sending user 310 uses a network connected client computing device to access secure fax server 300. Sending user 310 must be registered with an active account to access secure fax server 300. Access may involve logging in with identification such as a username or email, and password, or other authentication information. The client computing device may operate a dedicated software application or other software application which has integrated an application programming interface (API) to communicate with secure fax server 300, or may operate a web browser to access an HTML web interface for communicating with secure fax server 300.

Once authenticated, user 310 selects one or more native documents 330 for faxing. Selection may be through custom or standard file selection user interface components, such as Windows file selection dialogs within a software application, or HTML file input fields within a web browser. The selected native documents may be uploaded to secure fax server 300 through software application calls to a secure server API, such as AutoPost 400, or through an HTTP post action through web browser 410. In both cases the document may be encrypted, such as communicating through secure socket layers (SSL) between the client device and secure fax server.

In addition to uploading native documents for faxing, user 310 must specify a recipient for the fax. This may be done by specifying an identification of a registered user of the secure fax system, for example a unique user identification name or number, or by entering a recipient email address or fax number. Recipient identification may be input, for example, through the user interface of an application which has integrated the secure fax server API, through html input fields in a web browser interface, or selected through contact selection controls. The recipient identification may be submitted with the native document upload, or separately through an additional webpage or separate API communication. If submitted separately, a session identifier may be tracked (such as through browser cookies) to ensure correct association between the documents for faxing and the recipient. Additional configuration information, such as fax image format, desired fax resolution, and any fax color settings, also may optionally be entered and sent to the fax server.

In addition to the native documents and recipient identification, cover page information may be submitted to the secure fax server. The cover page information may be text and include information such as, but not limited to, identification of sender name and contact information, sending company and company contact information, recipient name and contact information, any special status such as urgent or review needed, and any general comments. Cover page information may be input, for example, through the user interface of an application which has integrated the secure fax server API, through html input fields in a web browser interface, or in some combination with automatic filling from contact selection controls. Cover page information may be submitted with the document upload communication, or separately through an additional webpage or separate API communication. If submitted separately, a session identifier may be tracked (such as through browser cookies) to ensure correct association between the documents for faxing and the cover page information. Optionally, cover page information may not be required, allowing users to provide custom cover pages as part of the native documents. An indication, such as an HTML checkbox, may be presented to enable/disable cover page information input, and communicated from the client device to the secure fax server.

Email Origination

An additional fax origination process may involve attaching the native documents to an email message. The secure fax server may include email server software, or a separate component comprising an email server may implement software to interact with the secure fax server through the API. Incoming email may be addressed to the email server in the form of recipient@domain, where recipient identifies the recipient of the fax, and domain identifies a URL or IP address mapped to the email server. Attachments to an incoming email may be treated as native documents, with recipient used to identify the fax recipient. Cover page and any configuration settings may be included in the text of the email in a pre-configured format, for example "field:value" where field identifies a cover page field, such as sender name, or configuration setting, such as resolution, and value identifies the text for a cover page field or specific setting for the indicated configuration. Such cover page and configuration settings may also be included in a specific attached file, which may be parsed and processed separately from other attachments (which are processed as native documents). Native documents received over email are processed and delivered by the secure fax server in the same manner as native documents uploaded through a webpage or API. Error notifications generated during the fax conversion or delivery process may be delivered to the sender by email to the email address sending the native documents.

Similarly, an existing fax number may be used, such as 1231231234@biscloud.com. If the fax number is already associated with an account registered with the secure fax server, fax delivery to that account may occur. If not associated with any account, traditional fax delivery to the fax number may occur. Additionally, companies can use such a system to merge existing fax numbers with email to enable receipt of high-resolution, color faxes either through addressing above, or by using the company's own domain name. For example, if a company has an existing (telephonic) fax number, faxnumber, and receives emails addressed to a specific domain, e.g. @companyname.com, the company may configure to receive high-resolution, color fax documents through email to faxnumber@companyname.com. Such company may implement its own secure fax server system, and integrate an existing email server, or may configure a desired email address (e.g., faxnumber@companyname.com) to forward any emails received at such email address to a third party operated secure fax server system. In such fashion, migration from telephonic faxes to secure, high-resolution, color faxes is possible while retaining and reusing an existing fax number, and any companies desiring to operate without traditional telephonic fax can still receive faxes with a recognizable format via email to faxnumber@companyname.com.

Secure Fax Server

Secure fax server 300 runs one or more software programs to manage user accounts, process incoming documents into fax documents, communicate with interfaces to provide user access and management functions, and securely store documents, faxes, and user account information on disk, network or other attached storage, and perform file and database management and interactions. The secure fax server may include additional components including a web server and translation server 340. These additional components may be integrated into the secure fax server, or network connected and operated on separate hardware or within separate virtual machines. The software programs and components may be implemented as separate threads within the same program, or as separate programs in communication with each other through inter-process communications. Each software program or component may be implemented as a software application or service. Details and additional secure fax server software and components are described below.

The web server may deliver an HTML-based interface for accessing the secure fax server through a web browser. This may include web pages for creating, managing, and logging into accounts on the secure fax server, as well as for creating faxes including upload native documents, identifying recipients, providing cover page information, accessing received faxes, and managing stored faxes. The secure fax server may provide an API with similar functionality, enabling applications to implement user interfaces independent of the web pages and fully operate with the secure fax server. User account information (such as, but not limited to, name, address, email, password) may be stored in a database, file storage, or other format on the secure fax server or on storage directly or network connected to the secure fax server. Fax documents may similarly be stored on the secure file server or on storage directly or network connected to the secure fax server. User account information and fax documents may be encrypted, such as using 256-bit Advanced Encryption Standard (AES), for secure storage.

Figure 5:
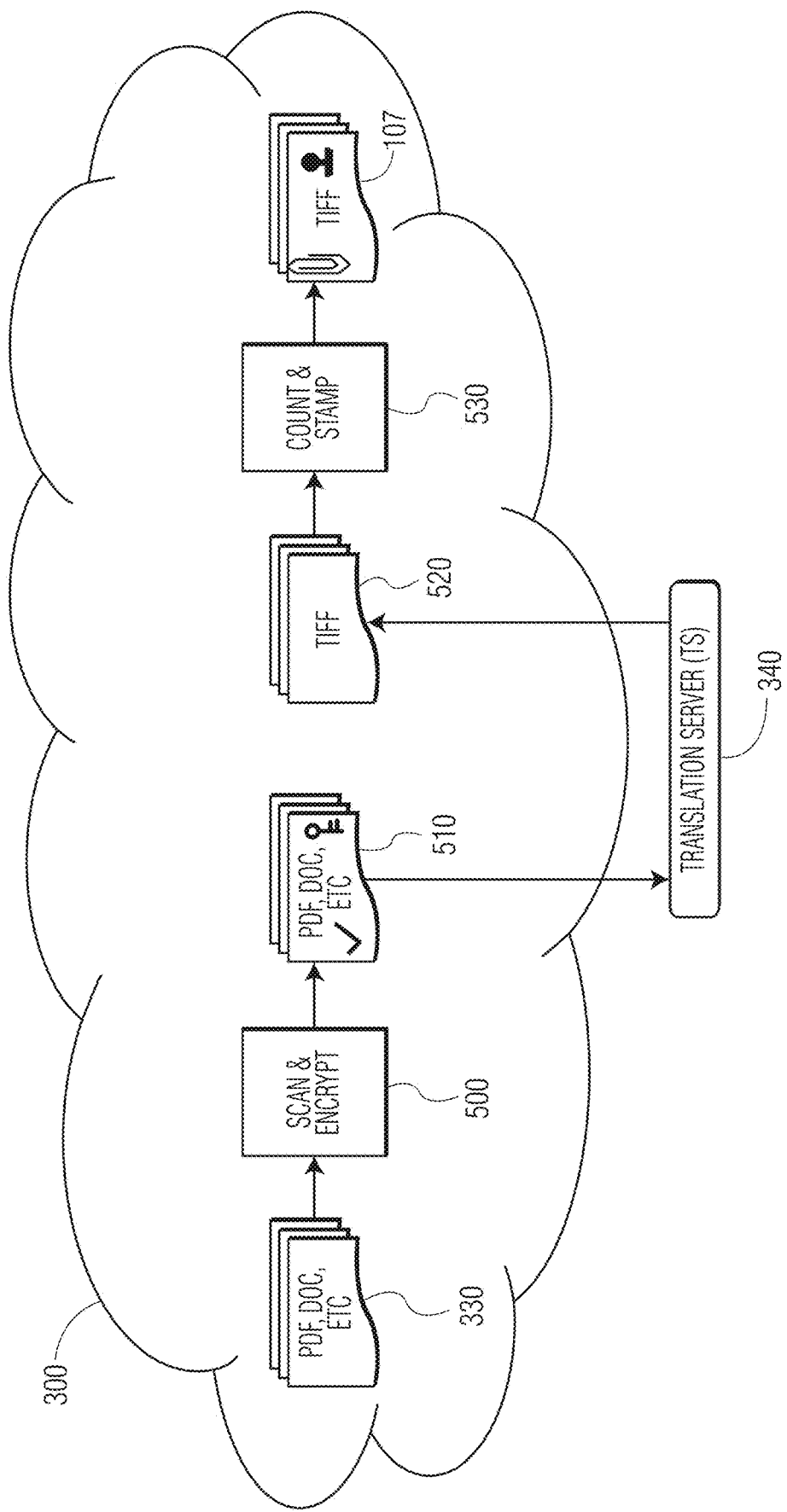
FIG. 5 is a block diagram of the file process involved in creating, sending, and receiving a fax through the secure file transfer fax system.

Referring also to FIG. 5, after a registered user authenticates with secure fax server 300 and uploads native documents 330, secure file server 300 scans 500 native documents 330 for viruses. Virus scanning may be through custom or commercial software. If viruses are found, secure file server 300 may delete the files and notify uploading user through an error message, displayed through a webpage or communicated through the API. If no viruses are found, the native documents are encrypted, stored as encrypted documents 510, and also sent to translation server 340. Sending to the translation server may involve transferring the entire file, or notifying the translation server of the stored native document location.

Figure 6:
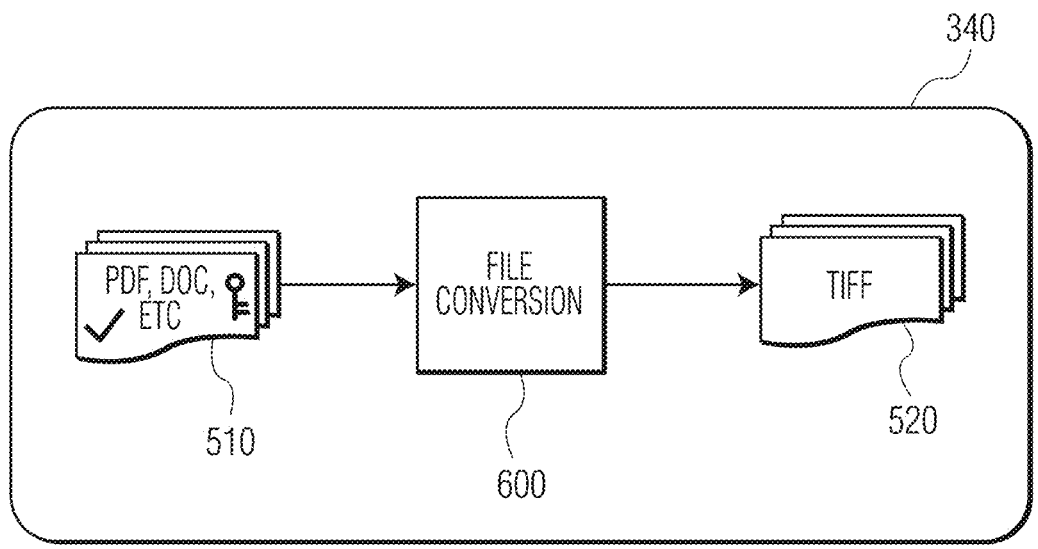
FIG. 6 is a block diagram of the file process occurring during a translation process converting native documents into images that will be used in a fax document.

Referring also to FIG. 6, translation server 340 converts 600 stored encrypted documents 510 into fax image format files 520. Any fax configuration settings, either submitted by the originating user or configured as defaults for that user, may also be sent from the secure fax server to the translation server. Conversion to the fax image format may match the configuration settings, such as selection of image format, resolution, and/or color settings. Absent specific configuration settings, default configurations may be used, for example defaults may be for a high-resolution color TIFF image format. Each page of the native documents may be a separate image file, or a separate page within a multi-page image file. After conversion, the translation server may transfer the image file(s) back, or store them and notify the secure fax server of the stored image file location(s).

After conversion into image format, the secure fax server may generate 530 a page count, generate and insert a cover page, and apply a time-stamp. The page count may be generated by counting the number of files created if single-page images were used, or reading a page count from a multi-page image. Information provided to the secure fax server during submission of the fax may be used to generate a cover page, by inserting text data into default locations of a document. An image version of the cover page may then be generated. Each page of the fax image document(s), as well as the cover page, may then have a timestamp inserted into the image using default color, position, and font settings and image editing functions. The cover page and all fax image files may then be combined into a single, multi-page fax image file 350, encrypted, and stored on disk or other storage directly or network attached to the secure fax server.

Notification 360 is sent to recipient 320 that a fax has been received. Notification is preferably an email message generated by the secure fax server and delivered to an email address entered by sending user 310 or retrieved by the fax server as the email address for recipient user 320, such as by name or other identifier lookup in a database. In event the recipient has an existing account configured to receive faxes at a BDR, the fax may be directly sent and printed from the BDR in place of the notification step.

Recipient

Figure 4B:
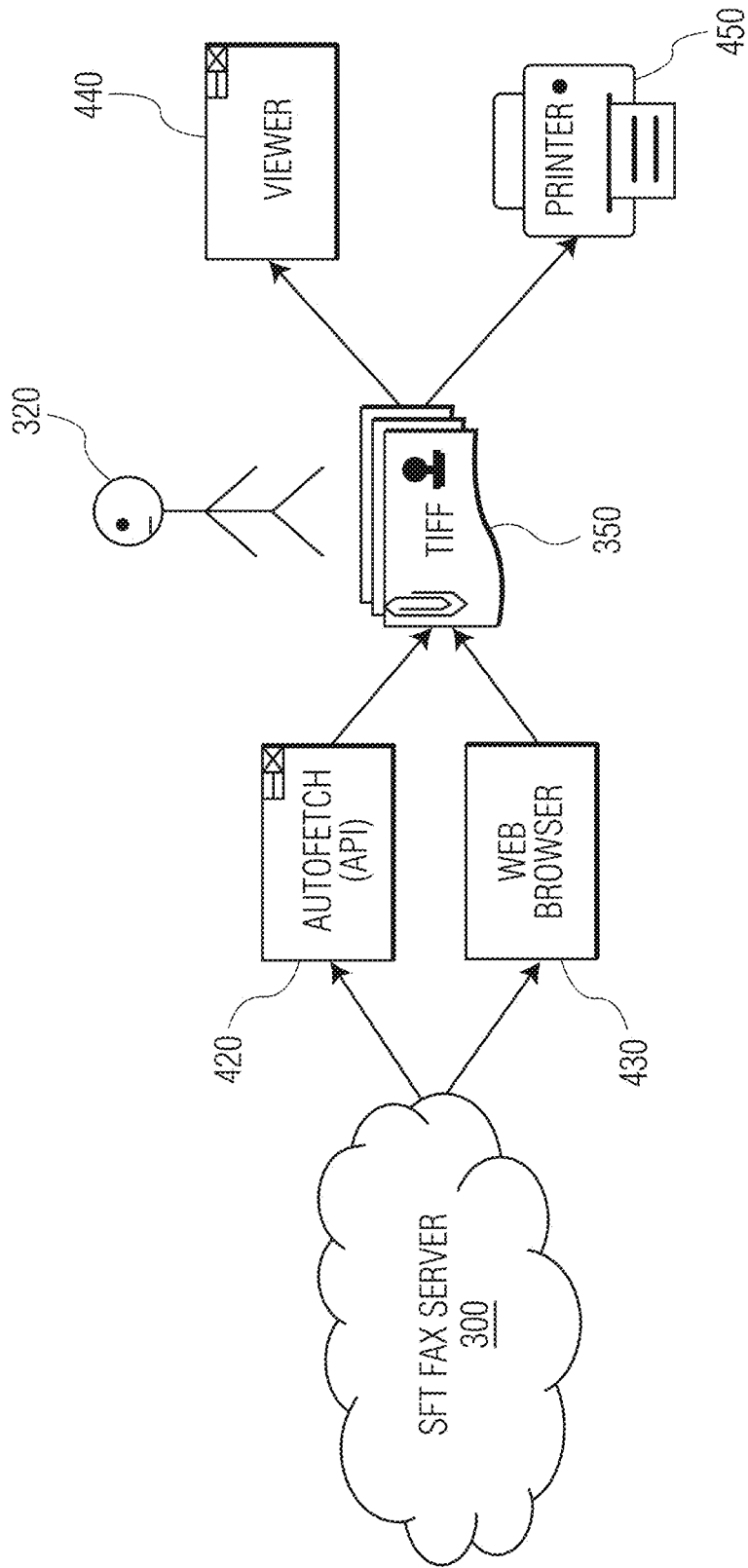
FIG. 4*b* illustrates the destination process for receiving a fax through the secure file transfer fax system.

Referring also to FIG. 4b, recipient user 320 uses a network connected client device to access secure fax server 300. If recipient user 320 is a new user to the system, the user may first register with the system by entering identification information and establishing a password or other information for authentication. Once registered, access may involve logging in with identification such as a username or email, and password, or other authentication information. The client device may operate a software application which has integrated an application programming interface (API) to communicate with secure fax server 300, or may operate a web browser to access an HTML web interface for communicating with secure fax server 300.

Once authenticated, user 320 may access or retrieve received fax 350. Access may be through software application calls to a secure server API, such as AutoFetch 420, or through web page access through web browser 430. In both cases, fax 350 may be encrypted, such as communicating through secure socket layers (SSL) between the client device and secure fax server. Fax 350 may be displayed through image viewer 440, such as a multi-page tiff plugin for a web browser or custom image viewer in a software application. Directly sending to printer 450 may also be used to print and view the fax. Fax management options, such as delete, archive, or forward may also be presented to recipient user 320 through a web browser interface or software application calling the secure server API.

Confirmation

Secure fax server 300 may monitor account and file activity, and when a fax is viewed or otherwise accessed send confirmation notification 360 to sending user 310. Confirmation notification is preferably email to an email address associated with the sending user, such as tracked in a database and associated with the sending user's account. Alternatively, an account may configure not receive confirmation notifications. In either case, a log may be retained for viewing by the user, allowing checking status of delivery, viewing, or printing (if to a BDR) of a fax. Similarly, if errors are generated at any stage of the fax process, such as translation errors converting to fax image format, or failure to notify the recipient (such as email returned as undeliverable), an error notification may be generated and sent to sending user 310, preferably as an email.

Nested Email Addressing

Figure 8:
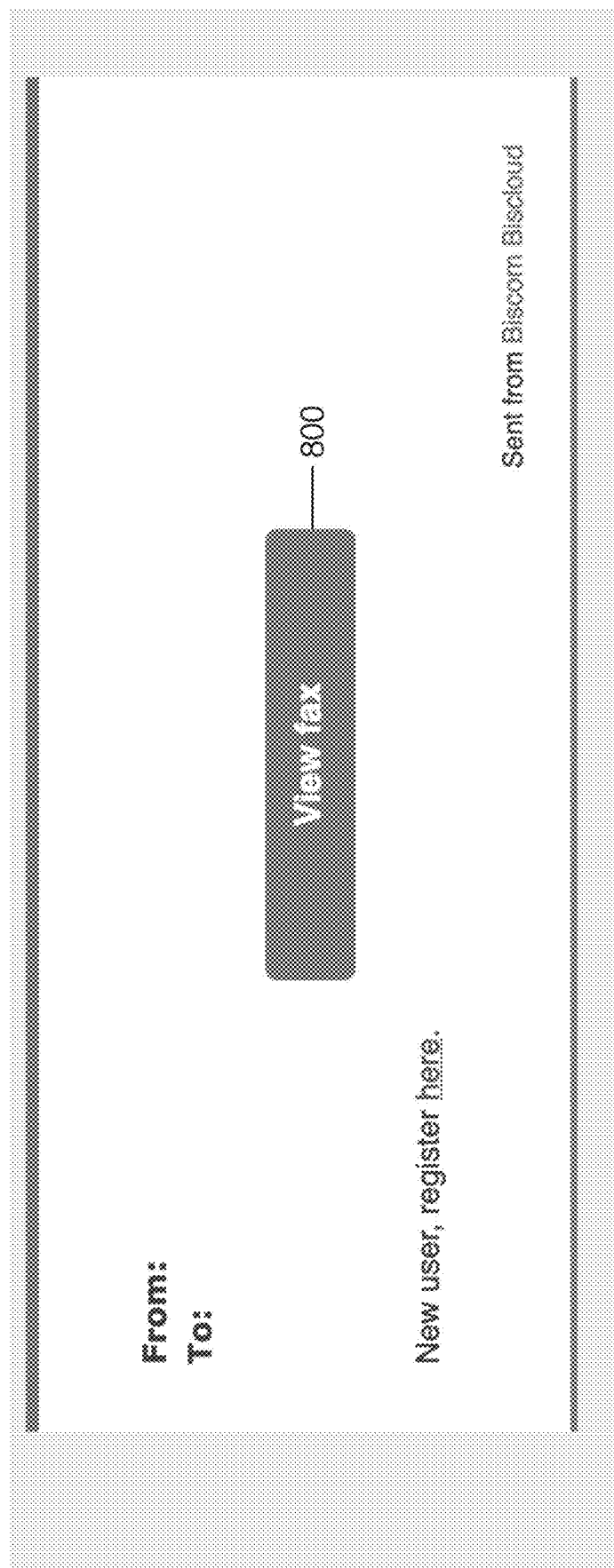
FIG. 8 is an example notification of a digital fax.

Nested email addressing uses one email address to reach a first destination domain, and within that email address include another "nested" email address to use as an email destination after processing at the first destination domain. Nested email delivery is achieved by using the first destination domain to deliver native documents to the secure fax server, and within the username of the email including an end recipient email address for receipt of the fax or other message from the secure fax server. As previously discussed, attached native documents are converted into a fax, with any email text body used for generating the fax cover page. However alternative to standard email delivery where recipient@domain identifies the recipient user at the specified domain, recipient may be an existing email address specifying both user and end destination domain, while domain specifies the domain address for receipt at the secure fax server. This nested email enables high-res, color faxing to any recipient, even those without prior account association with the secure fax server. If the recipient's traditional email address is name@server.com, the "@" may be replaced with a replacement token, such as $, allowing name$server.com@biscloud.com to be used as the destination for email with native documents attached. Upon reaching the secure fax server (configured to receive all emails to biscloud.com), the name$server.com is translated back to name@server.com for fax notification and delivery. Referring also to FIG. 8, when delivered as a fax, user notification may include a link 800 to retrieve the digital fax. If name@server.com is registered with the secure fax server, normal fax delivery may occur for that account (including direct delivery and printing through a BDR if so configured). If name@server.com is not registered, a fax received notification may be emailed to name@server.com with instructions to register an account to securely access and retrieve the fax. Such email submission enables multiple benefits. Users do not have to be registered with the secure fax system to send faxes, and can also work seamlessly with guest (non-registered) user recipients receiving email notification of received faxes with secure links to access.

Figure 9:
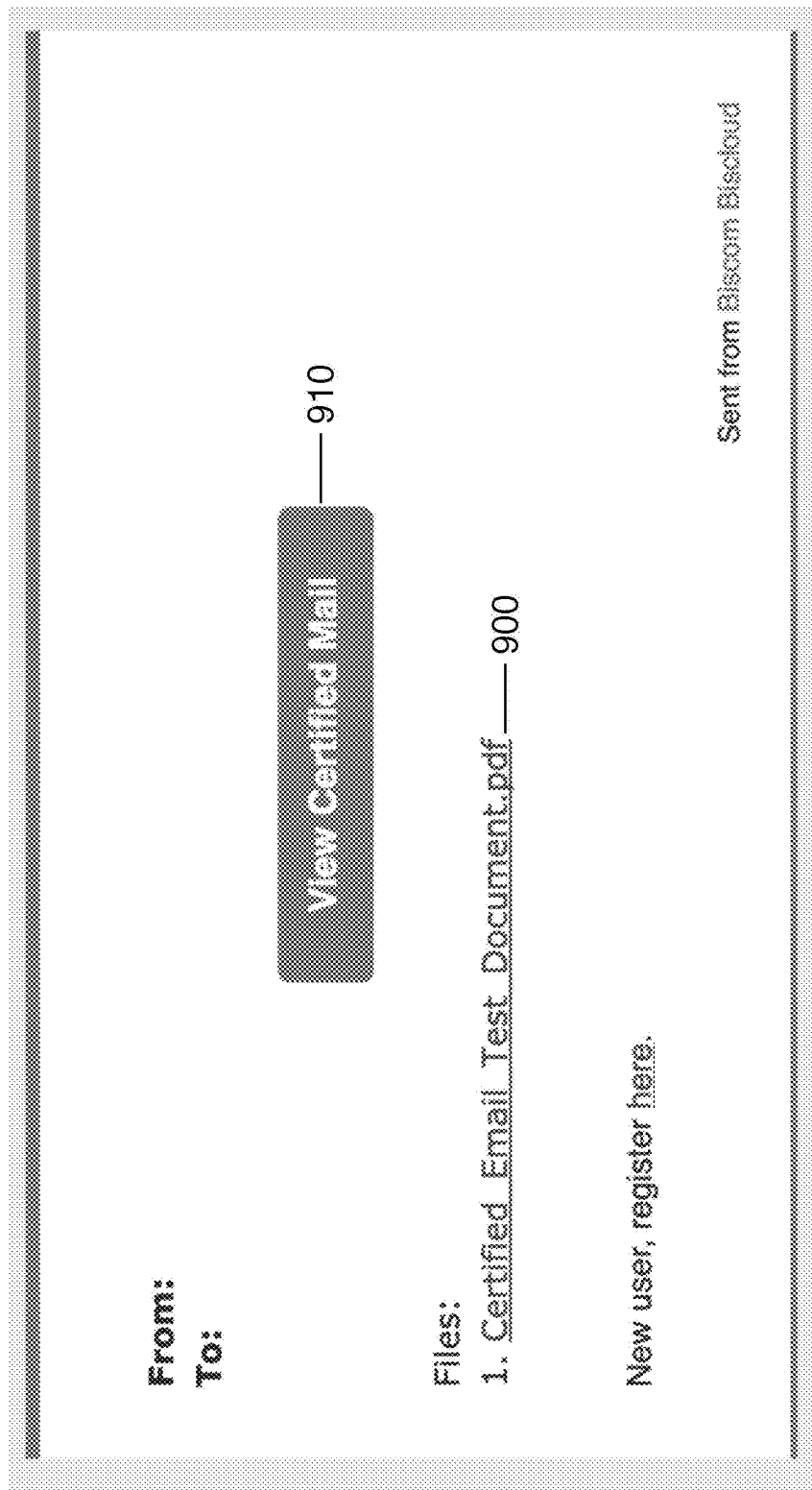
FIG. 9 is an example notification of a certified email.

Email submission features may be expanded beyond only faxing. The secure fax server may be extended to provide additional functionality based on alternative replacement tokens. For example, using '&' in name&server.com@biscloud.com may result in storing the native documents as a workspace on the secure fax server, and using '#' in name#server.com@biscloud.com may result in the email server sending as a certified email in order to track receipt rather than secure color fax delivery. For storage, the native documents may be stored within a workspace for an account associated with the sending email address. For certified emails, the native documents may be retained in their original format rather than conversion into a fax, and any email text body saved as a text file or other message format by the secure fax server. Referring also to FIG. 9, when delivered as a certified email, the notification email may include a link 900 to the native document for download without conversion into a digital fax, and a general link 910 to view any text body of the certified email. Certified email storage and user access may be through the secure fax server, ensuring secure access and tracking and logging views and downloads of the email and native documents. The native documents may be stored through the secure fax server such that any access of the emailed link and text body link may be logged, allowing tracking and verification of when the email and native documents are accessed.

The replacement token may be one or more control tokens specifying specific delivery or processing actions by the secure fax server. Additional functionality may also be extended with additional control identifiers. For example, if text-to-speech is included with a translation server operating with the secure fax server, voice calling may be added such as with an alternative replacement token '!' used in name!server.com@biscloud.com. Similarly, other document delivery, such as direct to a mobile app, via SMS, SFTP, or sync with specific file sharing or management service, may be implemented and configured for trigger given a specific replacement token. For delivery methods which do not use email, the email (name@server.com) may be used to identify destination identification (such as phone number for text or SMS) stored in an account at the secure server. If no account exists or an account exists back lacks needed information to deliver based on the control token, email notification may be sent to the end recipient (name@server.com).

Multiple replacement tokens also may be included, such as using name$&server.com@biscloud.com to both send as a digital fax and store in a workspace through the secure fax server. Security level may also be indicated through a token, such as including a token, to indicate if the digital fax or certified email may be directly attached in an email delivery, or if secure delivery is required through an account access at the secure fax server or related secure device (such as BDR retrieval). For example, secure delivery may be the default and also specified by inclusion of a specific secure delivery token, such as 'A', and delivery as an email attached specified by a different insecure delivery specific token, such as 'AA'. The replacement tokens and their associated functionality may also be configured at the secure fax server, allowing any particular token to be associated with a particular functionality. Tokens may be any configured sequence of one or more text symbols, numbers, letters, or other characters. A sequence including multiple tokens may trigger every token's action, or that specific sequence may be configured to trigger a specific different action.

Figure 10:
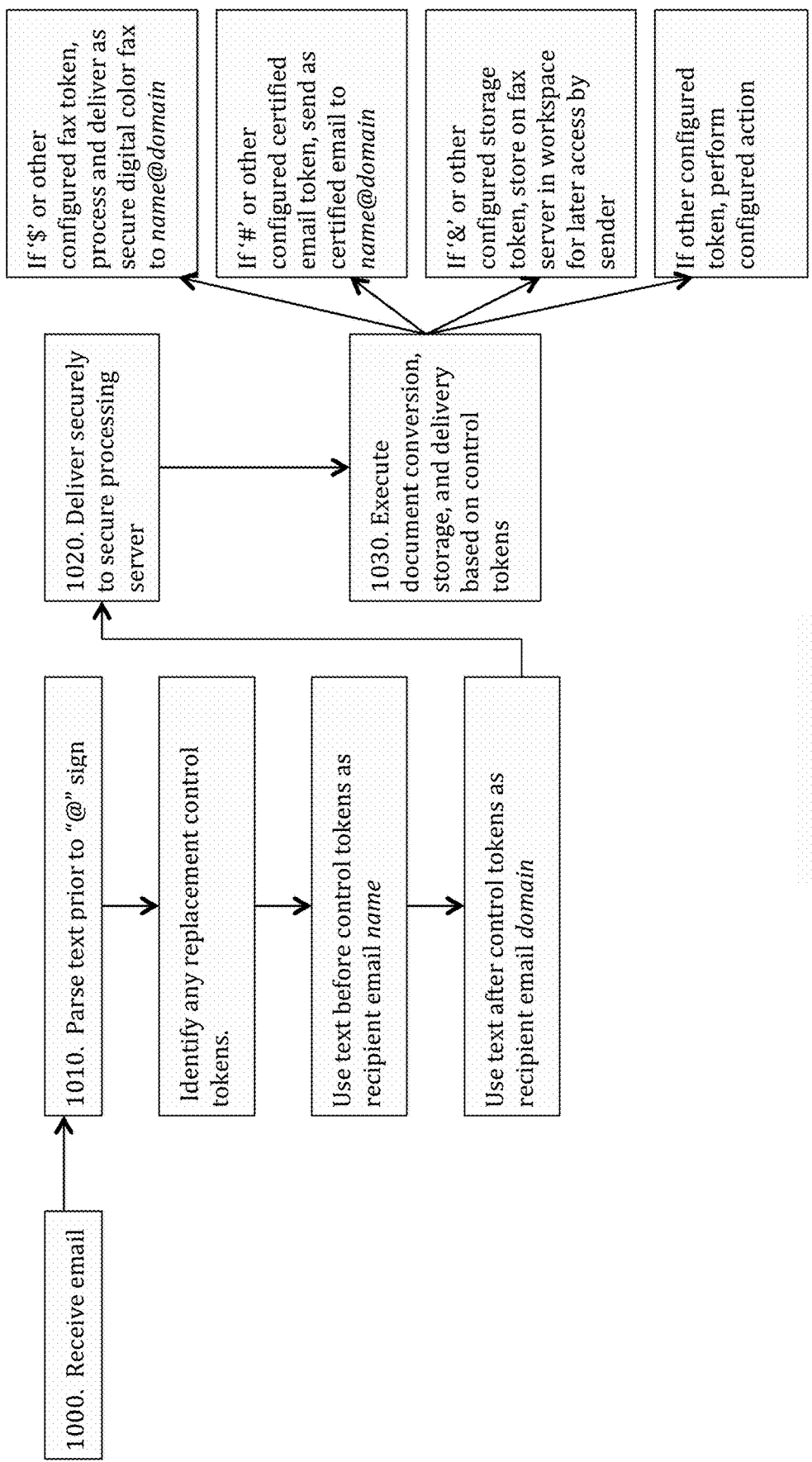
FIG. 10 is a flowchart depicting operation of the secure fax server with email origination and multiple delivery options configurable through email address token identifiers.

The secure fax server may be a secure processing server able to process native documents based on configured token triggers separately from fax functionality. Referring also to FIG. 10, overall processing may involve secure delivery 1000 of email to the email server using transport layer security (TLS). Text extraction 1010 and tokenization of the recipient email address may identify the destination email user name name, the destination email domain server.com, and the replacement token(s). Recipient information, text from the email body, any native documents attached, and type of delivery action based on the replacement token(s) are securely passed 1020 to the secure processing server. The secure processing server executes 1030 any appropriate conversion actions and delivers based on the identified delivery action.

For users sending native documents to the cloud through nested email, they may manually enter the nested email address with specified control tokens, or may use an email program with extensions to automatically convert a standard email address into nested delivery format. For example, an extension to Outlook may add "send as secure fax", "send as certified email", or "store in biscloud workspace" options which can be selected for any outgoing email message. Upon selection, the extension may automatically replace the "@" within the recipient's email address with the control tokens for the selected option(s), append the secure fax server destination domain (for example, "@biscloud.com"), and thereby send as a nested email to the secure fax server. Alternative to email program extensions, contact fields may be added for each user allowing selection between desired username (such as defaulting to "<user@domain.com>" but having alternative contact selections such as "[SECURE FAX]<user$domain.com@biscloud.com>", "[CERTIFIED EMAIL] <user#domain.com@biscloud.com>", and "[WORKSPACE] <user!domain.com@biscloud.com>".

OTHER EMBODIMENTS

Figure 7:
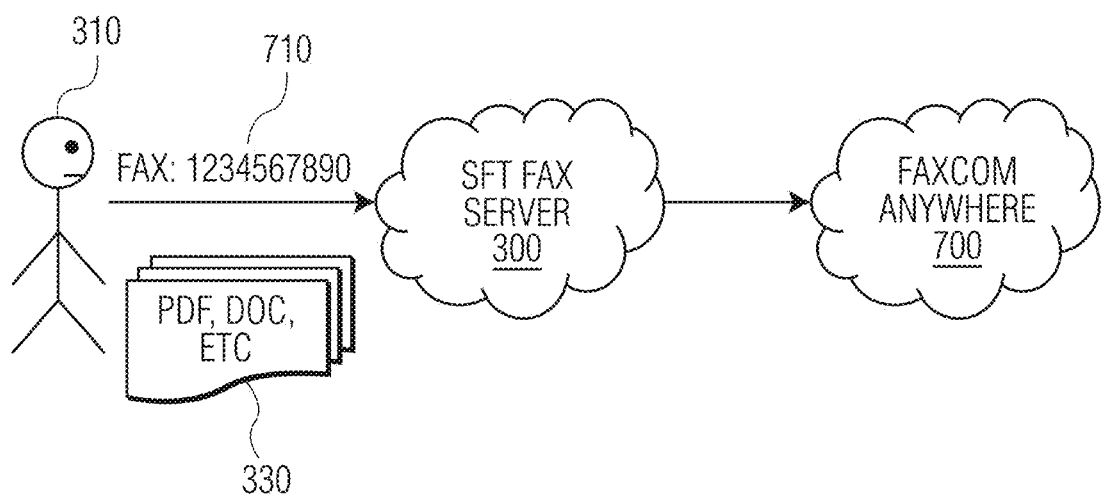
FIG. 7 illustrates integration of the secure file transfer fax system with traditional faxing.

Referring also to FIG. 7, in an alternate embodiment, the secure file transfer fax solution may also integrate traditional fax technology. This allows sending to or receiving from traditional fax servers. Secure fax server 300 may include fax boards for fax or fax-over-ip, or may communicate with traditional fax server 700 having such hardware. Sending user 310 may submit native documents 330 with a recipient identified by traditional fax number 710. After processing to a fax image, the fax image may be delivered to the traditional fax server over the internet, or directly delivered through fax hardware boards, to the destination fax number. In the case of traditional fax delivery, the fax image quality may be lower (black-and-white, and low resolution), due to limitation of traditional T.30 (fax over telephone lines) and T.38 (fax over IP) fax technology.

In addition to sending to traditional fax numbers, with fax boards integrated into the secure fax server, or with such hardware in a fax server in communication with the secure fax server, traditional faxes can be received by the secure file transfer fax solution. In this embodiment, registered users may associate a fax number available to the secure fax server or traditional fax server with their account. When a fax is received at such number, the associated user is notified, preferably by email, and may access the received fax in the same manner as accessing a fax as detailed above. Once again, due to limitations of traditional T.30 and T.38 fax technology, faxes received over telephone lines are low resolution and black-and-white fax images.

In another alternative embodiment, secure fax server 300 may allow guest users to interact with the secure fax system. Sending users may access the secure fax server as a guest, through a web browser or application integrating the API, to send a fax. Native documents and information associated with the fax (such as recipient, cover page information, and any quality selections) may be submitted in the same fashion with a registered user. An email address for the sending user may optionally be submitted to enable confirmation notification. A guest user will not have access to any files or account settings stored by the secure fax server, so any native documents and resulting fax from a guest user may have a default time period (for example, 14 days) after which it is automatically deleted by the secure fax server.

Guest users may similarly be able to receive faxes. The notification email may include a link to directly access a received fax without requiring user authentication. As such access is less secure, allowing guest receipt may be an optional setting submitted when initiating a fax, allowing the sending user to have control over secure receipt. As guest users do not have access to manage account or received faxes stored on the server, any fax sent to guest users may be automatically deleted after a default time period (for example, 14 days) by the secure fax server.

As guest users, both sending and recipients, includes issues with authentication, user management, and file management, enabling guest access is not generally preferred but may be desired for specific uses, such as organizations desiring capability to receive anonymous document submissions.

Another alternative embodiment may enable different or multiple notifications. Instead of email, notifications may be sent through the API directly to applications, or through different messaging systems such as SMS.

Another alternate embodiment may include integration of the BDR into a printer, rather than requiring separate connection to the printer.

Another alternate embodiment may include use of the BDR for sending faxes. In such embodiment, input is required (to specify recipient fax number or email address). This may be done by attaching a screen and keyboard to the BDR, or including a built-in display screen and input panel of letter and number buttons, or an equivalent touch-screen display. A scanner may be attached to the BDR, directly or across the network, or integrated into the BDR. The BDR may then securely transmit any image documents captured by the scanner to the secure fax server, as high resolution, color faxes originating from the account associated with the BDR.

Another alternate embodiment includes configuration of multiple accounts within one BDR. Faxes to any of the configured accounts may be received and printed. If multiple printers are connected or configured, such as networked printers, they may also be configured for specific user accounts (such that faxes to one configured user prints on a specific printer, while faxes to a different configured user print on a different printer, all received through the same BDR).

Alternative to hosting the secure fax server in a cloud services platform, individual server solutions may be separately deployed, such as for companies desiring to host their entire system. These dedicated systems operate in the same fashion as the cloud hosted solution, with configuration of server addressing to ensure communication with correct dedicated servers.

Any of the alternate embodiments may be implemented separately or in combination with each other as well as with the preferred embodiment previously described.

It is to be understood that the above description is intended to be illustrative, and not restrictive. Many other embodiments will be apparent to those of skill in the art upon reviewing the above description. The scope should, therefore, be determined with reference to the appended claims, along with the full scope of equivalents to which such claims are entitled.

What is claimed is:

1. A method of using nested email addressing, the method comprising:
    operating a cloud-based secure processing server;
    operating an email server as a module of or network-connected to the secure processing server, wherein the email server is configured to receive and process email addressed to a first destination domain name associated with the secure processing server;
    receiving an email at the email server addressed to an email address wherein the email address is structured as a recipient followed by a first @ symbol followed by the first destination domain name and the recipient is structured as an end destination recipient followed by one or more control tokens followed by an end destination domain, and wherein the email has one or more native documents attached to the email;
    parsing the email address to separate the end destination recipient, the one or more control tokens, and the end destination domain;
    translating the parsed email address and forming a destination email address by replacing the one or more control tokens with a second @ symbol such that the destination email address is structured as the end destination recipient followed by the second @ symbol followed by the end destination domain;
    identifying one or more secure processing server actions based on the one or more control tokens; and
    processing and delivering the one or more native documents through the identified processing server actions.

2. The method of claim 1, wherein the secure processing server is a secure fax server, and further comprising:
    when the identified one or more actions include faxing:
        translating, at a translation server communicating with the secure fax server, the native documents into a high-resolution color fax document which includes a cover page generated by the secure fax server, page numbers on each page inserted by the secure fax server, and a timestamp on each page inserted by the secure fax server;
        encrypting and storing, by the secure fax server, the high-resolution color fax document; and
        delivering the high-resolution color fax document to a user identified by the destination email address.

3. The method of claim 2, further comprising identifying if the destination email address is associated with an account registered with the secure fax server, and:
    if associated and fax delivery settings are configured for the account, delivering to the user based on the configured settings; or
    if not associated or no fax delivery settings are configured, sending an email to the destination email address with instructions to login or create an account on the secure fax server and access the high-resolution color fax document.

4. The method of claim 1, further comprising monitoring, by the secure processing server, account and file activity, and tracking, by the secure processing server, an activity log of when files are accessed.

5. The method of claim 4, further comprising:
    when the identified one or more actions include sending a certified email:
    storing the native documents through the secure processing server;
    sending an email to the destination email address with a link to access the native documents and a link to access a text body of the email; and
    verifying when the certified email was viewed based on the activity log.

6. The method of claim 1, further comprising:
    when the identified one or more actions include storage in a workspace:
    storing the native documents through the secure processing server in a workspace of an account associated with an email address of a sender of the email.

7. The method of claim 1, further comprising:
    when the one or more control tokens include indication of a security level, delivering documents as attachments to email to the destination email address when insecure delivery is specified, and delivering by secure access to the secure processing server when secure delivery is indicated.

8. The method of claim 1, further comprising configuring, at the secure processing server, different processing actions for different control tokens, wherein each control token may be configured as any sequence of one or more symbols, numbers, or letters not already assigned as a sequence for a different control token.

9. A method of using nested email addressing, the method comprising:
- operating a cloud-based secure fax server;
- operating an email server as a module of or network-connected to the secure fax server, wherein the email server is configured to receive and process email addressed to a first destination domain name associated with the secure fax server;
- receiving an email at the email server addressed to an email address wherein the email address is structured as a recipient followed by a first @ symbol followed by the first destination domain name and the recipient is structured as an end destination recipient followed by one or more control tokens followed by an end destination domain, and wherein the email has one or more native documents attached to the email;
- parsing the email address to separate the end destination recipient, the one or more control tokens, and the end destination domain;
- translating the parsed email address and forming a destination email address by replacing the one or more control tokens with a second @ symbol such that the destination email address is structured as the end destination recipient followed by the second @ symbol followed by the end destination domain;
- identifying one or more secure fax server actions based on the one or more control tokens;
- monitoring, by the secure fax server, account and file activity, and tracking, by the secure fax server, an activity log of when files are accessed;
- when the identified one or more actions include faxing:
  - translating, at a translation server communicating with the secure fax server, the native documents into a high-resolution color fax document which includes a cover page generated by the secure fax server, page numbers on each page inserted by the secure fax server, and a timestamp on each page inserted by the secure fax server;
  - encrypting and storing, by the secure fax server, the high-resolution color fax document;
  - identifying if the destination email address is associated with an account registered with the secure fax server, and:
    - if associated and fax delivery settings are configured for the account, delivering to the user based on the configured settings; or
    - if not associated or no fax delivery settings are configured, sending an email to the destination email address with instructions to login or create an account on the secure fax server and access the high-resolution color fax document;
- when the identified one or more actions include sending a certified email:
  - storing the native documents through the secure fax server;
  - sending an email to the destination email address with a link to access the native documents and a link to access a text body of the email; and
  - verifying when the certified email was viewed based on the activity log;
- when the identified one or more actions include storage in a workspace:
  - storing the native documents through the secure fax server in a workspace of an account associated with an email address of a sender of the email; and
- when the one or more control tokens include indication of a security level, delivering documents as attachments to email to the destination email address when insecure delivery is specified, and delivering by secure access to the secure fax server when secure delivery is indicated.

* * * * *